(12) United States Patent
Roehm et al.

(10) Patent No.: US 9,687,947 B2
(45) Date of Patent: Jun. 27, 2017

(54) HAND-HELD POWER TOOL DEVICE

(71) Applicant: Robert Bosch GmbH, Stuttgart (DE)

(72) Inventors: Heiko Roehm, Stuttgart (DE); Tobias Herr, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 674 days.

(21) Appl. No.: 14/062,542

(22) Filed: Oct. 24, 2013

(65) Prior Publication Data
US 2014/0116740 A1   May 1, 2014

(30) Foreign Application Priority Data
Oct. 25, 2012   (DE) ........................ 10 2012 219 498

(51) Int. Cl.
*B23Q 5/04* (2006.01)
*B25F 5/00* (2006.01)
*B25B 21/00* (2006.01)
*B23Q 1/70* (2006.01)
*B23Q 3/12* (2006.01)

(52) U.S. Cl.
CPC ............. *B23Q 5/043* (2013.01); *B23Q 1/70* (2013.01); *B25B 21/00* (2013.01); *B25F 5/001* (2013.01); *B23Q 3/12* (2013.01)

(58) Field of Classification Search
CPC .... B25F 5/00; B25F 5/02; B25F 5/001; B25B 21/00; B23B 31/123; B23B 31/207; B23Q 3/12
USPC ... 173/104, 109, 29, 48, 176, 178, 217, 213, 173/210, 211; 192/223, 223.2; 279/19.1, 279/19.4
See application file for complete search history.

(56) References Cited

U.S. PATENT DOCUMENTS

| 3,587,796 A | * | 6/1971 | Nestvogel | F16B 1/04 192/223 |
| 5,016,501 A | * | 5/1991 | Holzer, Jr. | B25B 21/00 173/181 |
| 5,984,022 A | * | 11/1999 | Harman, Jr. | B25F 5/001 173/176 |
| 6,035,947 A | * | 3/2000 | Chung | B25B 21/00 173/104 |
| 6,311,787 B1 | * | 11/2001 | Berry | B25F 5/001 173/176 |

(Continued)

FOREIGN PATENT DOCUMENTS

| CN | 1789741 A | 6/2006 |
| CN | 101043974 A | 9/2007 |

(Continued)

*Primary Examiner* — Scott A. Smith
(74) *Attorney, Agent, or Firm* — Gerard Messina

(57) ABSTRACT

A hand-held power tool device includes at least one spindle unit, which is provided in particular for transmitting a drive motion of a drive unit to a tool receptacle, and a locking unit, which is provided in particular for locking the at least one spindle unit in at least one locking state, and which has at least one spindle lock element, which includes at least one entrainment element, and which is provided for at least partially transmitting the drive motion of the drive unit to the at least one spindle unit in at least one operating state. The spindle lock element has at least one clamping surface, which is situated at least partially offset from the at least one entrainment element at least in an axial direction.

11 Claims, 2 Drawing Sheets

(56) References Cited

U.S. PATENT DOCUMENTS

| | | | | |
|---|---|---|---|---|
| 6,338,404 | B1 * | 1/2002 | Chen | B25F 5/001 173/178 |
| 6,454,020 | B1 * | 9/2002 | Jong | B25B 21/00 173/104 |
| 6,550,599 | B2 * | 4/2003 | Kudou | H02K 7/102 192/223.2 |
| 6,675,910 | B1 * | 1/2004 | Lin | B23B 31/207 173/109 |
| 6,715,562 | B1 * | 4/2004 | Chen | B25F 5/001 173/176 |
| 6,805,206 | B2 * | 10/2004 | Hanke | B25D 17/088 173/104 |
| 7,048,107 | B1 * | 5/2006 | Geis | F16D 41/105 192/223.2 |
| 7,287,602 | B2 * | 10/2007 | Zeiter | B25F 5/001 173/164 |
| 7,367,757 | B2 * | 5/2008 | Phillips | B23B 45/003 173/214 |
| 7,395,874 | B2 * | 7/2008 | Zeiter | B25F 5/001 173/176 |
| 7,506,694 | B2 * | 3/2009 | Stirm | B25F 5/00 173/176 |
| 7,644,929 | B2 * | 1/2010 | Frauhammer | B23Q 3/12 279/19.4 |
| 7,900,713 | B2 * | 3/2011 | Chen | B23B 45/008 173/178 |
| 8,075,229 | B2 * | 12/2011 | Mok | B23B 31/123 279/62 |
| 8,939,232 | B2 * | 1/2015 | Blum | B25D 16/003 173/216 |
| 9,108,306 | B2 * | 8/2015 | Hecht | B25B 21/00 |
| 9,242,353 | B2 * | 1/2016 | Hecht | B25B 21/00 |
| 2002/0101106 | A1 | 8/2002 | Kim et al. | |
| 2002/0130007 | A1 * | 9/2002 | Nakamura | B25F 5/001 192/38 |
| 2004/0231952 | A1 * | 11/2004 | Nakamura | B25F 5/001 192/223 |
| 2006/0084370 | A1 * | 4/2006 | Robieu | B24B 23/028 451/359 |
| 2007/0084616 | A1 * | 4/2007 | Lam | B25F 5/02 173/217 |
| 2007/0267207 | A1 * | 11/2007 | Ito | B25B 21/02 173/217 |
| 2011/0214892 | A1 * | 9/2011 | Hecht | B25B 21/00 173/164 |

FOREIGN PATENT DOCUMENTS

| | | |
|---|---|---|
| CN | 102186632 A | 9/2011 |
| EP | 19552818 A2 | 8/2008 |
| JP | 2008121848 A | 5/2008 |

* cited by examiner

HAND-HELD POWER TOOL DEVICE

CROSS REFERENCE TO RELATED APPLICATION

The present application claims priority to Application No. DE 10 2012 219 498.3, filed in the Federal Republic of Germany on Oct. 25, 2012, which is expressly incorporated herein in its entirety by reference thereto.

FIELD OF INVENTION

The present invention relates to hand-held power tool devices.

SUMMARY

The present invention is directed to a hand-held power tool device having at least one spindle unit, which is provided in particular for transmitting a drive motion of a drive unit to a tool receptacle, and having a locking unit, which is provided in particular for locking the at least one spindle unit in at least one locking state, and which has at least one spindle lock element, which includes at least one entrainment element and is provided in at least one operating state at least partially for transmitting the drive motion of the drive unit to the at least one spindle unit.

It is proposed that the spindle lock element has at least one clamping surface, which is situated at least partially offset from the at least one entrainment element at least in one axial direction. "Provided" is to be understood in particular to mean specially designed, configured, and/or equipped. "Locking" in this context is to be understood in particular to mean that transmission in particular of the drive motion at least to the spindle unit is prevented. Locking may take place in a force-locked and/or form-locking manner. The at least one spindle lock element is preferably alternatively or additionally at least partially provided for locking the spindle unit in a locking state at least partially, preferably completely, in a force-locked manner, in particular, via clamping. The spindle lock element preferably has at least one element, at least one surface, and/or another structure which appears reasonable to those skilled in the art, which is at least partially provided to generate at least one clamping force in particular in a locking state. "In a force-locked manner" is to be understood in particular to mean that friction force is transmitted between at least two components. An "entrainment element" is to be understood in this context in particular as an element which is at least partially provided to transmit a movement at least partially, preferably completely. "Situated offset in the axial direction" is to be understood in this context in particular to mean that the clamping surface and the entrainment element are situated at least partially, preferably completely, in succession when viewed in the axial direction of the spindle unit. In a particularly preferred exemplary embodiment, it is conceivable that the clamping surface and the entrainment element are situated spaced apart when viewed in the axial direction of the spindle unit.

The design of the hand-held power tool device according to the present invention makes it possible to achieve advantageously low manufacturing costs, a preferably flexible applicability of the hand-held power tool device in various hand-held power tools, a structurally simple design of the hand-held power tool device, and advantageously high reliability.

In addition, it is recommended that the at least one clamping surface of the spindle lock element is at least partially provided for transmitting the drive motion of the drive unit to the spindle lock element in an operating state. It is thus possible to achieve a preferably compact design of the hand-held power tool device.

In addition, it is proposed that the at least one clamping surface of the spindle lock element and at least one entrainment face of the entrainment element of the spindle lock element are situated at least partially in succession in the axial direction. The at least one clamping surface of the spindle lock element and at least one entrainment face of the entrainment element follow each other preferably at least partially, in particular directly, when viewed in the axial direction. It is thus possible to achieve a preferably stable and light design of the hand-held power tool device.

Furthermore, it is proposed that the at least one clamping surface of the spindle lock element and at least one entrainment face of the entrainment element of the spindle lock element are situated at least partially offset from each other in the circumferential direction. It is thus possible to achieve a structurally simple design of the hand-held power tool device.

In addition, it is proposed that the entrainment element of the spindle lock element is situated at least partially within a bearing element of the spindle unit in the radial direction. In this context, "within . . . in the radial direction" is to be understood in particular to mean that the spindle lock element is situated after the bearing element in the radial direction, in particular when viewed from the outside toward a center point. It is thus possible to achieve an advantageously space-saving design and a preferably small diameter of the hand-held power tool device in a structurally simple manner.

Furthermore, it is proposed that the at least one spindle lock element is at least partially coupled in a form-locking manner to the spindle unit. "In a form-locking manner" is to be understood to mean that adjacent surfaces of components which are connected to each other in a form-locking manner exert a retention force on each other acting in the normal direction of the surfaces. In particular, the components are geometrically engaged with each other. It is thus possible to achieve a structurally simple, economical, reliable design of the hand-held power tool device. Furthermore, a separated design of the spindle lock element and the spindle unit, which are coupleable to each other in a form-locking manner, makes it possible in a particularly preferred example to couple the spindle lock element to differently designed spindle units in a preferably simple manner, thus making it possible to achieve a flexibly replaceable and advantageously economical spindle lock element and a preferably low component variance.

In addition, it is proposed that the at least one entrainment element of the spindle lock element is at least partially provided to correspond to at least one entrainment element of the spindle unit. This makes it possible to achieve an advantageously reliable and economical transmission, in particular, of the drive motion, preferably to the spindle, in a structurally simple manner.

Furthermore, it is proposed that the entrainment element of the spindle lock element and the entrainment element of the spindle unit at least partially form a groove and tongue unit. However, it is also conceivable that the entrainment element of the spindle lock element and the entrainment element of the spindle unit each have a polygon-shaped cross section which corresponds to the other, and/or are formed as a claw clutch. Other designs which appear reasonable to those skilled in the art are also conceivable. It is thus possible to achieve a structurally simple, robust, reliable design of the entrainment elements.

In addition, it is proposed that the coupling between the spindle lock element and the spindle unit is designed to be subject to play at least partially in the circumferential direction, in the radial direction, and/or in the axial direction. In this context, "subject to play" is to be understood in particular to mean that a particularly manufacturing- and/or application-related movement clearance between at least two components is provided, in which it is possible to move the at least two components at least partially freely toward each other in an assembled state. The play between the spindle lock element and the spindle unit is in particular not more than 2 mm, preferably not more than 1 mm, preferably not more than 0.5 mm, and particularly preferably not more than 0.2 mm. It is thus at least partially possible to achieve a preferred alignment between the spindle lock element and the spindle unit and thus advantageous, good force transmission. Furthermore, it is possible to ensure the function and trouble-free operation of the hand-held power tool device at least partially, preferably at least almost completely independently of manufacturing tolerances, in particular of the spindle lock element and the spindle unit.

Additional advantages result from the following description of the drawings. The drawings illustrate one exemplary embodiment of the present invention. The drawings and the description contain many features in combination. Those skilled in the art will also advantageously examine the features individually and combine them into expedient additional combinations.

DETAILED DESCRIPTION

Figure 1:
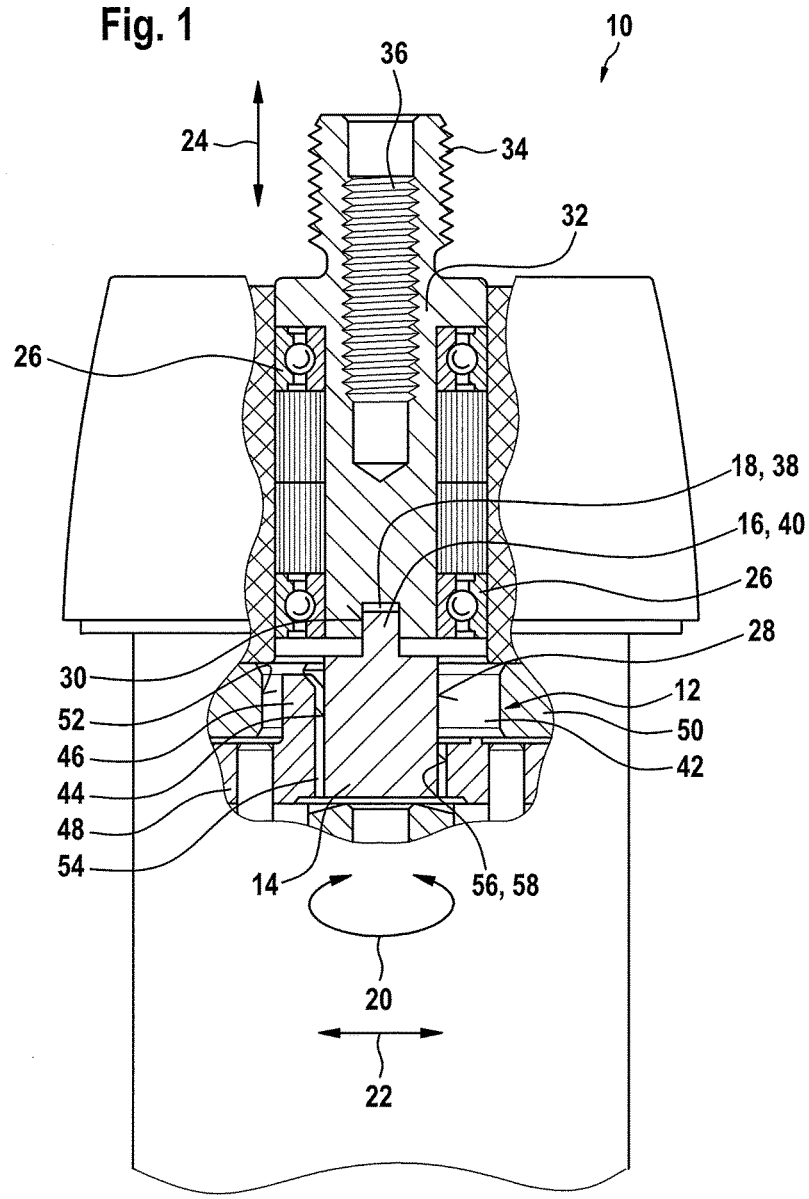
FIG. 1 shows a hand-held power tool device according to the present invention in a partially cut-away view.
Figure 2:
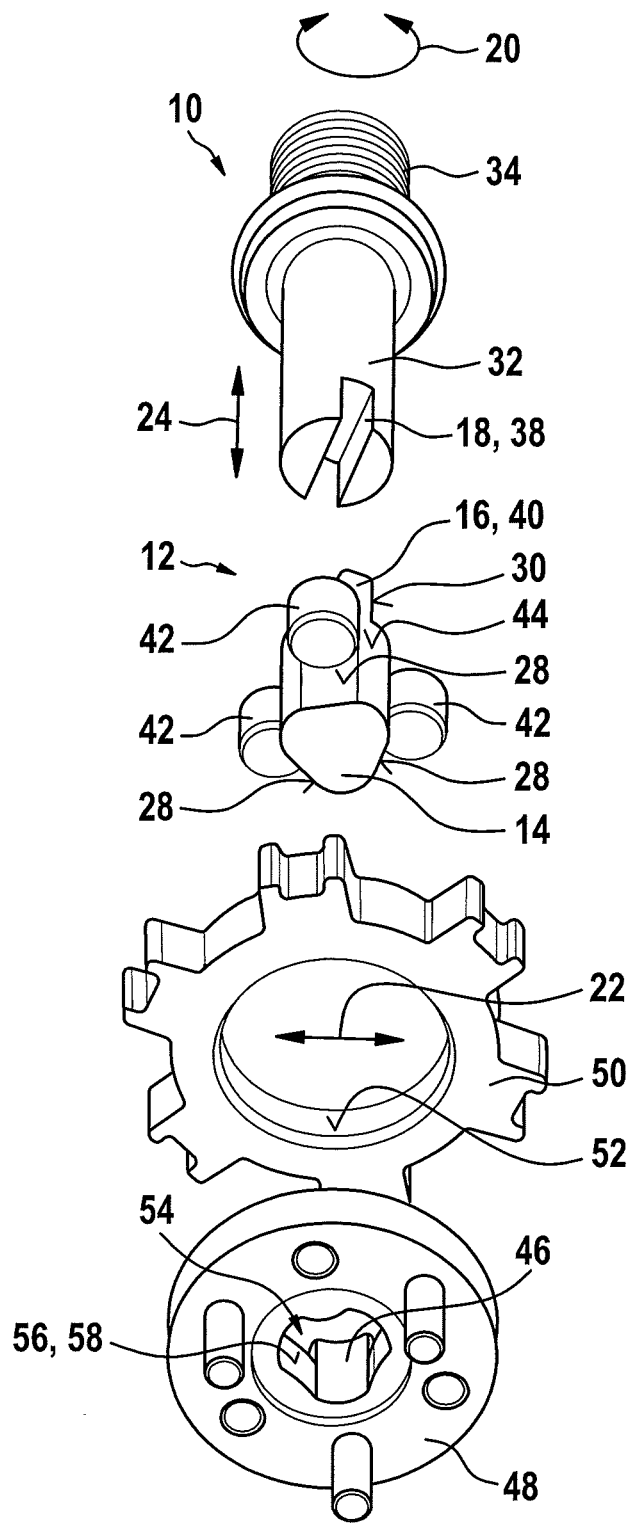
FIG. 2 shows the hand-held power tool device according to the present invention in an exploded view.

FIGS. 1 and 2 show a hand-held power tool device of a hand-held power tool having a spindle unit 10, which includes a drive spindle 32 and which is provided for transmitting a drive motion of a drive unit (not shown) to a tool receptacle (not shown). The hand-held power tool is formed from a drill or a screwdriver. However, other designs of the hand-held power tool which appear reasonable to those skilled in the art are also conceivable. The drive unit includes an electric motor. However, other designs of the drive unit which appear reasonable to those skilled in the art are also conceivable. The tool receptacle is designed such that it is coupleable to drive spindle 32 of spindle unit 10. For this purpose, drive spindle 32 of spindle unit 10 has an external thread 34 and an internal thread 36 on an end facing away from the drive unit, to which it is possible to screw the tool receptacle. However, it is also conceivable that the tool receptacle is designed as one piece with drive spindle 32. Spindle unit 10 also has two bearing elements 26. Bearing elements 26 are provided for directly contacting and rotationally supporting drive spindle 32 within a housing of the hand-held power tool. Bearing elements 26 are formed from ball bearings.

The hand-held power tool device furthermore has a locking unit 12, which is provided for locking spindle unit 10 in a locking state. Locking unit 12 includes a spindle lock element 14, which is provided for transmitting the drive motion of the drive unit to drive spindle 32 of spindle unit 10 in an operating state. Spindle lock element 14 is coupled in a form-locking manner to drive spindle 32 of spindle unit 10 in an assembled state. For this purpose, spindle lock element 14 has an entrainment element 16. Drive spindle 32 has an entrainment element 18 on an end facing away from the tool receptacle. Entrainment element 16 of spindle lock element 14 is provided to correspond to entrainment element 18 of drive spindle 32 of spindle unit 10. Entrainment element 16 of spindle lock element 14 and entrainment element 18 of drive spindle 32 of spindle unit 10 form a groove and tongue unit in an assembled state.

Entrainment element 18 of drive spindle 32 of spindle unit 10 is formed from a groove 38. Entrainment element 18 of drive spindle 32 has a rectangular cross section. Entrainment element 18 of drive spindle 32 extends along an entire diameter of drive spindle 32. Entrainment element 16 of spindle lock element 14 is formed from an extension. Entrainment element 16 of spindle lock element 14 is formed from a tongue 40. Entrainment element 16 of spindle lock element 14 has a rectangular cross section. Entrainment element 16 of spindle lock element 14 extends along an entire diameter of spindle lock element 14. Entrainment element 18 of drive spindle 32 and entrainment element 16 of spindle lock element 14 are provided to engage into one another in an assembled state and thus to couple drive spindle 32 of spindle unit 10 and spindle lock element 14 to each other. The coupling between spindle lock element 14 and spindle unit 10 is designed to be subject to play in radial direction 22. Alternatively or additionally, the coupling between spindle lock element 14 and spindle unit 10 may be designed to be subject to play in circumferential direction 20 and/or in axial direction 24. Entrainment element 16 of spindle lock element 14 in radial direction 22 is situated within one of bearing elements 26 of spindle unit 10.

Spindle lock element 14 has clamping surfaces 28. Spindle lock element 14 has three clamping surfaces 28 which are situated distributed uniformly over a circumference of spindle lock element 14 in circumferential direction 20. Clamping surfaces 28 are situated spaced apart from each other, viewed in circumferential direction 20. Clamping surfaces 28 are situated offset to entrainment element 16 of spindle lock element 14 in axial direction 24. Entrainment element 16 of spindle lock element 14 has two entrainment faces 30 running in parallel to each other. Clamping surfaces 28 of spindle lock element 14 and entrainment faces 30 of entrainment element 16 are situated in succession in axial direction 24. Viewed in axial direction 24, clamping surfaces 28 of spindle lock element 14 and entrainment faces 30 of entrainment element 16 directly adjoin each other. Clamping surfaces 28 of spindle lock element 14 and entrainment faces 30 of entrainment element 16 are situated offset from each other in circumferential direction 20.

Clamping surfaces 28 are flat. In an assembled state, a clamping element 42 is adjacent to each of clamping surfaces 28. Clamping elements 42 are formed from clamping rollers. Clamping elements 42 are each adjacent to a peripheral surface on clamping surface 28. Linear contact occurs between clamping element 42 and clamping surface 28 in an assembled state. A main extension direction of clamping element 42 and a main extension direction of clamping surface 28 run in parallel to each other and to axial direction 24 in an assembled state.

A guide surface 44 is situated between each of clamping surfaces 28 in circumferential direction 20. Guide surfaces 44 are each formed from a partial cylinder surface. In an assembled state, a guide element 46 of a gear element 48 of a gear unit which is not shown in detail is adjacent to each of guide surfaces 44. Gear element 48 is formed from a planet carrier.

Locking unit 12 includes a locking element 50 which encompasses spindle lock element 14 in circumferential direction 20 in an assembled state. Locking element 50 is annular. Locking element 50 is situated rotatably fixed relative to the housing of the hand-held power tool which has the hand-held power tool device. Locking element 50 has an inner peripheral surface 52 which is provided to contact clamping elements 42 in an assembled state. The peripheral surface of each of clamping elements 42 is adjacent to inner peripheral surface 52 of locking element 50. Linear contact occurs between clamping element 42 and inner peripheral surface 52 of locking element 50 in a locking state.

In an assembled state, spindle lock element 14 engages into a central recess 54 of gear element 48 of gear unit in axial direction 24. A partial area of clamping surfaces 28 of spindle lock element 14, which faces away from drive spindle 32, is partially adjacent to an inner peripheral surface 56 of drive element 48 in an assembled state. Inner peripheral surface 56 of gear element 48 has an entrainment contour 58 which corresponds to clamping surfaces 28 and is provided to transmit a drive motion of the drive unit to spindle lock element 14 in an operating state. Clamping surfaces 28 of spindle lock element 14 have a defined play and are adjacent to entrainment contour 58 of inner peripheral surface 56 of gear element 48 in an assembled state. The play is provided to allow a defined rotational movement between gear element 48 and spindle lock element 14.

In a normal operating state, a drive torque is transmitted from gear element 48 via entrainment contour 58 of inner peripheral surface 56 of gear element 48 via clamping surfaces 28 to spindle lock element 14. If the torque transmitted via drive spindle 32 to spindle lock element 14 and gear element 48 exceeds the drive torque in special cases, clamping surfaces 28 of spindle lock element 14 adjust themselves within the play between clamping surfaces 28 of spindle lock element 14 and entrainment contour 58 of inner peripheral surface 56 of gear element 48 and establish a clamping connection between spindle lock element 14 and locking element 50 via clamping elements 42, so that the torque transmitted via drive spindle 32 to spindle lock element 14 supports itself via locking element 50 on the housing of the hand-held power tool and locks spindle lock element 14 and thus also drive spindle 32. This function is also provided if the drive direction of the drive unit reverses.

What is claimed is:

1. A hand-held power tool device, comprising:
   at least one spindle unit, which is adapted for transmitting a drive motion of a drive unit to a tool receptacle, and
   a locking unit, which is adapted for locking the at least one spindle unit in at least one locking state, and which includes at least one spindle lock element, which includes at least one entrainment element and is adapted in at least one operating state at least partially for transmitting the drive motion of the drive unit to the at least one spindle unit,
   wherein the spindle lock element includes at least one clamping surface, which is situated at least partially offset from and upstream to the at least one entrainment element at least in an axial direction.

2. The hand-held power tool device according to claim 1, wherein the at least one clamping surface of the spindle lock element is at least partially adapted for transmitting the drive motion of the drive unit to the spindle lock element in an operating state.

3. The hand-held power tool device at least according to claim 1, wherein the at least one clamping surface of the spindle lock element and at least one entrainment face of the entrainment element of the spindle lock element are situated at least partially in succession in the axial direction.

4. The hand-held power tool device at least according to claim 1, wherein the at least one clamping surface of the spindle lock element and at least one entrainment face of the entrainment element of the spindle lock element are situated at least partially offset from each other in a circumferential direction.

5. The hand-held power tool device according to claim 1, wherein the entrainment element of the spindle lock element is situated at least partially within at least one bearing element of the spindle unit in a radial direction.

6. The hand-held power tool device according to claim 1, wherein the at least one spindle lock element is at least partially coupled in a form-locking manner to the spindle unit.

7. The hand-held power tool device according to claim 1, wherein a coupling between the spindle lock element and the spindle unit is adapted to be subject to play at least partially in a circumferential direction, in a radial direction, and/or in the axial direction.

8. The hand-held power tool device according to claim 1, wherein the at least one spindle lock element is arranged flush with the spindle unit.

9. The hand-held power tool device according to claim 1, wherein a diameter of the at least one spindle lock element is substantially the same as the diameter of the spindle unit.

10. A hand-held power tool, comprising:
    at least one hand-held power tool device, comprising:
      at least one spindle unit, which is adapted for transmitting a drive motion of a drive unit to a tool receptacle, and
      a locking unit, which is adapted for locking the at least one spindle unit in at least one locking state, and which includes at least one spindle lock element, which includes at least one entrainment element and is adapted in at least one operating state at least partially for transmitting the drive motion of the drive unit to the at least one spindle unit,
    wherein the spindle lock element includes at least one clamping surface, which is situated at least partially offset from the at least one entrainment element at least in an axial direction,
    wherein the at least one entrainment element of the spindle lock element is at least partially adapted to correspond to at least one entrainment element of the spindle unit,
    wherein the entrainment element of the spindle lock element is formed as a tongue and the entrainment element of the spindle unit is formed as a groove, and in an assembled state at least partially forming a groove and tongue unit.

11. A hand-held power tool device, comprising:
    at least one spindle unit, which is adapted for transmitting a drive motion of a drive unit to a tool receptacle, and
    a locking unit, which is adapted for locking the at least one spindle unit in at least one locking state, and which includes at least one spindle lock element, which includes at least one entrainment element and is adapted in at least one operating state at least partially for transmitting the drive motion of the drive unit to the at least one spindle unit, wherein the spindle lock element includes at least one clamping surface, which is situated at least partially offset from the at least one entrainment element at least in an axial direction, wherein the at least one entrainment element of the spindle lock element is at least partially adapted to correspond to at least one entrainment element of the spindle unit, wherein the entrainment element of the spindle lock element is formed as a tongue and the entrainment element of the spindle unit is formed as a groove, and in an assembled state at least partially forming a groove and tongue unit.

\* \* \* \* \*